(12) United States Patent
Gross et al.

(10) Patent No.: US 9,254,769 B2
(45) Date of Patent: Feb. 9, 2016

(54) STRUCTURAL ELEMENT FOR A MOTOR VEHICLE

(75) Inventors: Bernd Gross, Langenfeld (DE); Christian Hubsch, Dusseldorf (DE); Joshua Hesterberg, Mettmann (DE); Dirk Angermann, Wermelskirchen (DE); Dirk Eckenroth, Bergisch Gladbach (DE); Stefan Funk, Leichlingen (DE); Andreas Dannheisig, Sassenberg (DE); Hans-Georg Werner, Langenfeld (DE); Wolfgang Pellenz, Meckenheim (DE); Robin Ndagijimana, Neuss (DE); Vikas Wayal, Kothrud Punie (IN); Praveen Koparde, Pune (IN); Yaniv Oren, Cologne (DE); Martin Zynda, Burscheid (DE); Vedat Nuyan, Wuppertal (DE)

(73) Assignee: Johnson Controls GmbH, Burscheid (DE)

( * ) Notice: Subject to any disclaimer, the term of this patent is extended or adjusted under 35 U.S.C. 154(b) by 375 days.

(21) Appl. No.: 13/394,662

(22) PCT Filed: Sep. 15, 2010

(86) PCT No.: PCT/EP2010/005667
§ 371 (c)(1),
(2), (4) Date: Apr. 10, 2012

(87) PCT Pub. No.: WO2011/032691
PCT Pub. Date: Mar. 24, 2011

(65) Prior Publication Data
US 2012/0187738 A1    Jul. 26, 2012

(30) Foreign Application Priority Data

Sep. 16, 2009 (DE) .......................... 10 2009 041 428
May 5, 2010 (DE) .......................... 10 2010 019 577

(51) Int. Cl.
*B60N 2/68* (2006.01)
*B21D 26/14* (2006.01)
(Continued)

(52) U.S. Cl.
CPC ................ *B60N 2/682* (2013.01); *B21D 26/14* (2013.01); *B21D 53/88* (2013.01); *B23K 20/06* (2013.01);
(Continued)

(58) Field of Classification Search
CPC .... B60N 2/682; B60N 2/2809; B60N 2/2893; B21D 26/14; B21D 53/88; B23K 20/06; B23K 20/2333; B23K 2201/006
USPC .............................. 297/452.2, 452.18, 440.13
See application file for complete search history.

(56) References Cited

U.S. PATENT DOCUMENTS 4,085,814 A * 4/1978 Davidson et al. .......... 180/206.7
4,585,246 A * 4/1986 Diekman et al. ........... 280/281.1
(Continued)

FOREIGN PATENT DOCUMENTS

DE    202004020792 U1    3/2006
JP        55-149732        11/1980
(Continued)

OTHER PUBLICATIONS

Chinese Office Action dated Jan. 6, 2014 (Appln. No. 201080041290.4).
(Continued)

*Primary Examiner* — Milton Nelson, Jr.
(74) *Attorney, Agent, or Firm* — The Dobrusin Law Firm, P.C.

(57) ABSTRACT

The invention relates to a structural element (100) of a motor vehicle, in particular of a motor vehicle seat, wherein the structural element (100) comprises a first component (101) and a second component (102). In an overlap region (103), the first component (101) and the second component (102) have a formed-closed connection, or a form-closed and form-closed connection, wherein the connection in the overlap region (103) can be produced by an electromagnetic pulse shaping method, wherein the first component comprises at least one form-closed molding (600), wherein the second component can be molded into the at least one form-closed molding (600).

10 Claims, 8 Drawing Sheets

(51) Int. Cl.
  *B21D 53/88* (2006.01)
  *B23K 20/06* (2006.01)
  *B23K 20/233* (2006.01)
  *B60N 2/28* (2006.01)

(52) U.S. Cl.
  CPC .......... *B23K 20/2333* (2013.01); *B60N 2/2809* (2013.01); *B60N 2/2893* (2013.01); *B23K 2201/006* (2013.01)

(56) References Cited

U.S. PATENT DOCUMENTS

| | | | |
|---|---|---|---|
| 5,937,496 | A * | 8/1999 | Benoit et al. ................. 29/419.2 |
| 6,270,104 | B1 * | 8/2001 | Nelson et al. .............. 280/281.1 |
| 6,389,697 | B1 | 5/2002 | Benoit et al. |
| 6,484,384 | B1 | 11/2002 | Gibson et al. |
| 6,908,024 | B2 | 6/2005 | Martin et al. |
| 7,891,740 | B2 * | 2/2011 | Boes ........................ 297/452.18 |
| 2006/0145474 | A1 | 7/2006 | Fischer et al. |
| 2010/0270845 | A1 * | 10/2010 | Wilson et al. ............ 297/452.18 |
| 2011/0163587 | A1 * | 7/2011 | Kmeid et al. .............. 297/452.2 |

FOREIGN PATENT DOCUMENTS

| | | |
|---|---|---|
| JP | 06-312229 | 11/1994 |
| JP | 2005-138177 | 2/2005 |
| JP | 2005-138177 | 6/2005 |
| JP | 2007-168622 | 7/2007 |
| SU | 1139004 A | 5/1979 |
| TW | 273943 B1 * | 2/2007 |
| WO | 98/03797 | 1/1998 |
| WO | 98/03797 A1 | 1/1998 |
| WO | 2004/058429 A1 | 7/2004 |
| WO | 2009/056294 A1 | 5/2009 |
| WO | 2011/032691 A1 | 3/2011 |

OTHER PUBLICATIONS

Notification of Transmittal of Translation of the International Preliminary Report on Patentability (Chapter I or Chapter II) dated Mar. 29, 2012.
Korean Office Action dated Feb. 28, 2014; Application No. 10-2012-7009753.
Korean Office Action dated Feb. 28, 2014; Application No. 10-2012-7009753 (English Translation).
Japanese Examination Report dated Aug. 6, 2013.

* cited by examiner

STRUCTURAL ELEMENT FOR A MOTOR VEHICLE

CLAIM OF PRIORITY

This application claims priority from German application serial number 10 2009 041428.2 filed 16 Sep. 2009 and from German application serial number 10 2010 019577.4 filed 5 May 2010, and is a national application based on PCT Application International Application PCT/EP2010/005667, filed 15 Sep. 2010 (published as WO2011/032691) and claims the benefit of the filing date of 15 Sep. 2010, all incorporated herein by reference.

PRIOR ART

The invention is based on a structural element according to the preamble of claim 1.

Such structural elements of motor vehicles are generally known. For example, structural elements of this type are produced by a first component and a second component being connected to each other in an interlocking manner in an overlapping region by the components being connect to each other in the overlapping region, for example by press-joining.

However, these methods have the disadvantage that the components have to be very precisely adjusted, thus causing a high degree of complexity. In addition, these methods require a comparatively large overlapping region in order, for example, to ensure a required strength of the connection.

It as therefore the object of the present invention to provide a structural element for a motor vehicle without the disadvantages of the prior art.

DISCLOSURE OF THE INVENTION

This object is achieved by the structural element according to the invention, the component according to the invention, the method according to the invention and the device according to the invention.

The structural element according to the invention, the component according to the invention, the method according to the invention and the device according to the invention as per the further dependent claims have the advantage over the prior art that the components can be connected to one another in the overlapping region without complicated adjustment. Furthermore, it is advantageously possible for only a comparatively small overlapping region to be required and nevertheless for a stable connection to be able to be achieved. The connection is advantageously produced very precisely.

These advantages are achieved by a structural element according to the invention, wherein the structural element has a first component and a second component, wherein the first component and the second component have an interlocking or interlocking and frictional connection in an overlapping region, wherein the connection in the overlapping region can be produced by an electromagnetic pulse shaping method, wherein the first component has at least one interlocking molding in the overlapping region, wherein the second component can be molded into said at least one interlocking molding.

In the electromagnetic pulse shaping method, the dynamic action of a pulsed magnetic field is used to accelerate and subsequently deform an electrically conductive material. Since the magnetic field penetrates electrically non-conductive materials, conductive materials which are coated with a non-conductive material can advantageously also be processed. The deformation advantageously takes place without cracks forming in the surfaces. The pulsed magnetic field is generated by a coil through which a current pulse flows. The magnetic field induces eddy currents in the electrically conductive material and briefly exerts a very high force such that the electrically conductive material is plastically deformed as soon as the generated force exceeds the yield point of the material. The method can advantageously be carried out contactlessly and in a comparatively short time. The deformation process advantageously takes place within a comparatively short time and proceeds very precisely since the very rapid deformation process results in only minimal spring-back. This makes it possible to join different materials contactlessly and to produce a fixed connection. An advantage of this process is that the materials are not affected by heat, and therefore there is no thermal distortion and no need for realignment. There is advantageously no heat influencing zone, as in the case of thermal welding methods, and therefore no loss of strength in the connection region and in the overlapping region. Furthermore, this method ensures comparatively high repetition accuracy.

The components can be manufactured from any material, wherein the second component is preferably produced from electrically conductive material, preferably from aluminum material, magnesium material or steel material, or comprises a material consisting of material-to-material bonding connections of different materials. The components preferably comprise a metal material, wherein, furthermore preferably, a steel material or an aluminum material or a magnesium material can be used. Furthermore, it is possible to use a fiber reinforced plastic, preferably a carbon fiber reinforced plastic (CFRP) or a glass fiber reinforced plastic (GFRP) for the first component. For example, it is possible to use high-strength steel only in regions subjected to a particularly great load and to use only comparatively light materials in regions which are exposed to smaller loads. Furthermore, it is possible for different materials to be combined with one another, for example the first component consisting of high-strength steel and the second component consisting of weight-saving aluminum.

The components may have any cross-sectional profile. The cross section is preferably a closed profile, preferably of circular design, or of polygonal, preferably hexagonal or octagonal design, at least in the overlapping region. Use is preferably made of tubes or profiles with longitudinal edges. However, cross-sectional profiles, for example U profiles, T profiles or I profiles are also possible. Use is preferably made of flat profiles.

The components may furthermore have a comparatively small wall thickness, and therefore weight can advantageously be saved by means of small wall thicknesses.

Furthermore, it is advantageously possible, with the structural element according to the invention, that, for example, tubular frames having small radii and also consisting of high-strength steels can be provided.

In a preferred embodiment, the first component has at least one depression and/or bead. The second component is molded into said depression and/or bead by means of an electromagnetic pulse shaping method.

The first component preferably has a multiplicity of depressions and/or beads which are arranged at a uniform distance from one another.

According to a preferred development, the at least one interlocking molding of the first component is designed in the overlapping region as a bead, wherein the bead preferably has a bead depth which varies in the longitudinal direction of the bead. This advantageously enables a connection which is particularly secure, for example, against tension, compression, torsion, bending and combinations thereof, in a simple manner.

According to a preferred development, the at least one interlocking molding of the first component is designed in the overlapping region as a bead, wherein the bead is arranged parallel or perpendicularly to a main direction of extent of the first component. As an alternative, the bead is arranged at an angle of between 30° and 60°, preferably between 40° and 50°, and furthermore preferably between 44° and 46°, with respect to the main direction of extent of the first component. The first component preferably has the interlocking molding and at least one further interlocking molding in the overlapping region, wherein the interlocking molding and the further interlocking molding are designed as beads having in each case a longitudinal direction, wherein the longitudinal directions of the beads are arranged parallel to one another. Furthermore preferably, the first component has at least two or at least three interlocking moldings in the overlapping region, wherein the interlocking moldings are arranged at a uniform spacing of the angle at the circumference from one another.

According to a further preferred embodiment, the second component can be molded into the interlocking molding by means of an electrically conductive driving element. It is thereby advantageously possible to mold the second component into the interlocking molding of the first component even if the second component consists of a non-conductive or only slightly conductive material, such as, for example, stainless steel.

A further subject matter of the present invention is a component for use as a first component of a structural element according to the invention, wherein the component has at least one interlocking molding in an overlapping region. The at least one interlocking molding is preferably produced by means of an electromagnetic pulse shaping method. As a result, it is advantageously possible for the interlocking moldings and the structural element consisting of the first and second components to be able to be produced in the same device for carrying out the electromagnetic pulse shaping method without additional machines, for example a hydraulic press.

A further subject matter of the present invention is a method for producing a structural element, wherein, in a first step, the second component is arranged in the overlapping region between the first component and a coil, wherein, in a second step, a magnetic field is generated in the overlapping region by means of the coil, and wherein, in a third step, the second component is molded into an interlocking molding of the first component in the overlapping region.

A further subject matter of the present invention is a device for producing a structural element, comprising a coil for generating a magnetic field in an overlapping region, a first component with at least one interlocking molding in the overlapping region and a second component for molding into the interlocking molding of the first component, wherein the second component is arranged in the overlapping region between the first component and the coil.

As a further subject matter, the invention relates to a vehicle seat structure (also called hybrid structural element below) for a vehicle seat, in particular for a motor vehicle.

Structural elements of this type are described, for example, in WO 2009/056294 A1, to which reference is expressly made in this disclosure. Components and methods are presented there, with which it is possible to assemble a structural element, such as a vehicle backrest or seat frame, in such a manner that this can be made substantially of identical parts. Furthermore, the connection of different frame materials to one another, a "hybrid construction", is described.

It is the object of the present invention to further standardize a seat structure of the type in question in a steel/steel or steel/lightweight construction material construction in order to reduce storage and assembly costs and which has a low weight and is nevertheless strong.

The object is achieved according to the invention by a structural construction as is explained by way of example with reference to the figures below for a divided rear seat backrest. However, this example is not intended to restrict the disclosure and can also be applied to a motor vehicle seat in any seat row. The example is just as little intended to restrict the use to a backrest component.

Advantageous refinements and developments of the invention can be gathered from the dependent claims and from the description with reference to the drawings.

Exemplary embodiments of the present invention are illustrated in the drawings and are explained in more detail in the description below.

EMBODIMENT(S) OF THE INVENTION

In the various figures, identical parts are always provided with the same reference numbers and are therefore generally referred to or mentioned only once in each case.

Figure 1:
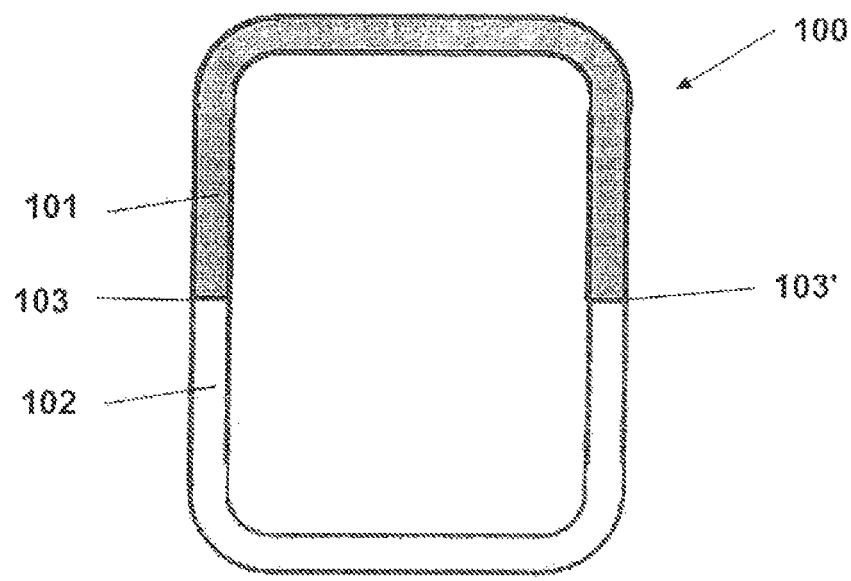
FIGS. 1 to 5 show schematic illustrations of exemplary embodiments of the structural element according to the invention.

FIG. 1 schematically illustrates a first embodiment of the structural element according to the invention. The structural element 100 is used in motor vehicles, and is used, for example, as a frame structure for a backrest and/or for a seat cushion of a motor vehicle seat. The structural element 100 has a first component 101 and a second component 102. The components are each designed as U bows. The first component 101 preferably comprises a high-strength material, for example a steel material or a fiber-reinforced plastics material. The second component 102 comprises an electrically conductive material, and, preferably, use is made of a light metal, such as aluminum or magnesium, and alloyed steel or a material consisting of material-to-material bonding connections of different materials. In order to connect the first component to the second component, the components are connected to each other in an interlocking or interlocking and frictional manner in the overlapping regions 103, 103' by means of an electromagnetic pulse shaping method. The use of hybrid structures consisting of sheet-metal and aluminum profiles enables a substantial reduction in weight, thus advantageously furthermore enabling carbon dioxide emissions to be reduced. As a tubular frame, the structural element 100 can consist of different tube profiles having various wall thicknesses, different diameters and different materials (steel/aluminum) and different material properties. The tubular frame is constructed to meet requirements and, for example, high-strength steel profiles are used only in the regions in which extremely high forces occur. By contrast, other regions of correspondingly lower requirements can be configured, for example, with aluminum profiles. As a result, it is possible to generate a comparatively good balance between weight, crash performance and costs. Furthermore, it is advantageously possible to realize certain radii in the corner regions without cracks arising. By means of the directed formulation of the suitable material and the properties associated therewith, the quality of the tubular frames in respect of producibility, tolerance-sensitivity, spring-back behavior, etc. can be significantly influenced and improved. These described tubular frame requirements and properties can be realized by means of the electromagnetic pulse shaping method. This method makes it possible to be able reliably to produce an interlocking or frictional and interlocking connection between the two different materials used (aluminum/steel).

Figure 2:
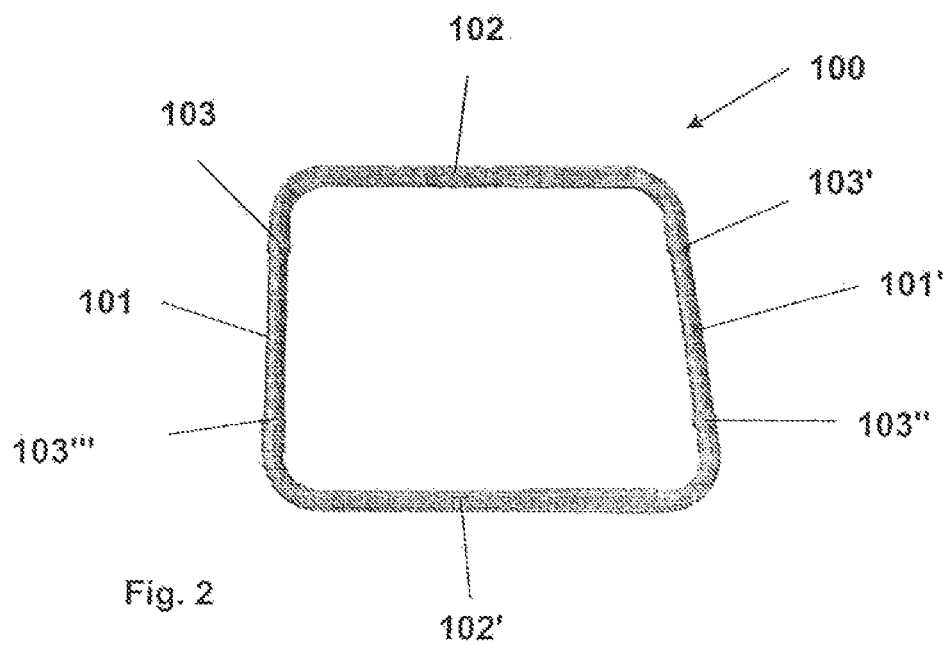

FIG. 2 schematically illustrates a second embodiment of the structural element 100 according to the invention. The first component 101, 101' is designed as a longitudinal tube section, but may also be designed, for example, as an angled tube, and the second component 102, 102' is designed as a U bow. At the four overlapping regions 103, 103', 103", 103''', the second component 102, 102' is in each case molded onto the first component 101, 101' by means of the electromagnetic pulse shaping method. Otherwise, reference is made to FIG. 1.

Figure 3:
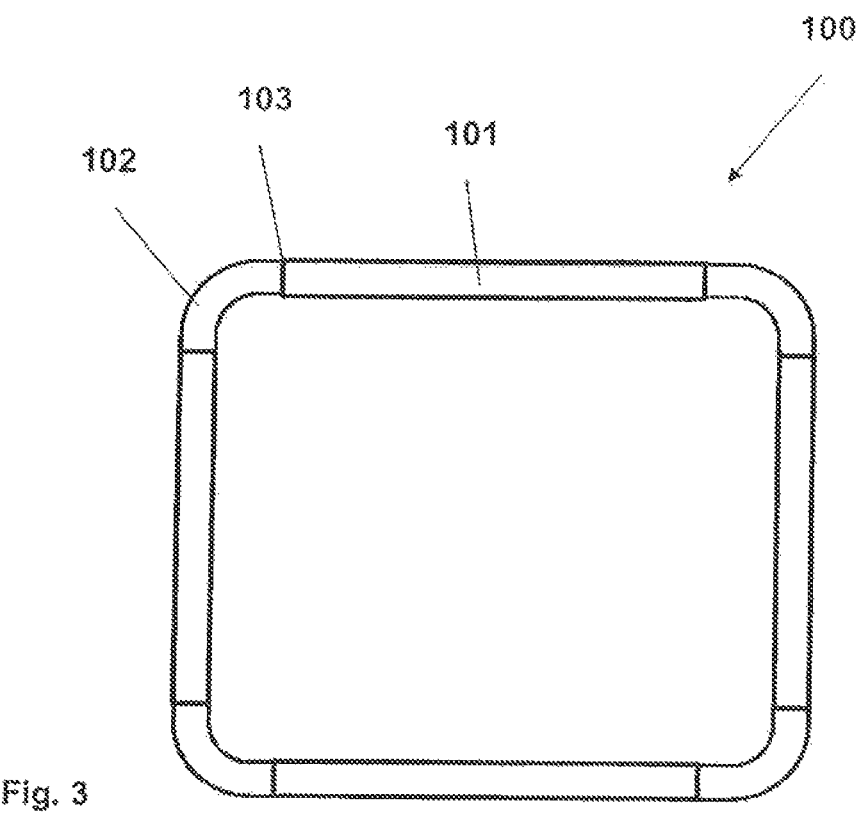

FIG. 3 schematically illustrates a third embodiment of the structural element 100 according to the invention. The structural element 100 has four longitudinal tube sections, which may also be designed, however, for example as an angled tube, as first components 101 composed of a light metal and four corner connectors 102 composed of high-strength steel as the second components 102. The first components 101 are molded onto the corner connectors 102 by means of the electromagnetic pulse shaping method. It is advantageously possible for the very different geometries to be able to be produced using standardized corner connectors. Furthermore, it is possible for a plurality of connections to be produced at the same time, thus advantageously enabling the manufacturing duration of the structural element to be considerably reduced. Otherwise, reference is made to FIG. 1.

As an alternative, it is also possible for the longitudinal tube sections to be manufactured from high-strength steel or from a fiber-reinforced material, and for the corner connectors, which are manufactured, for example, from a light metal, to be molded onto the longitudinal tube sections by means of the electromagnetic pulse shaping method.

Figure 4:
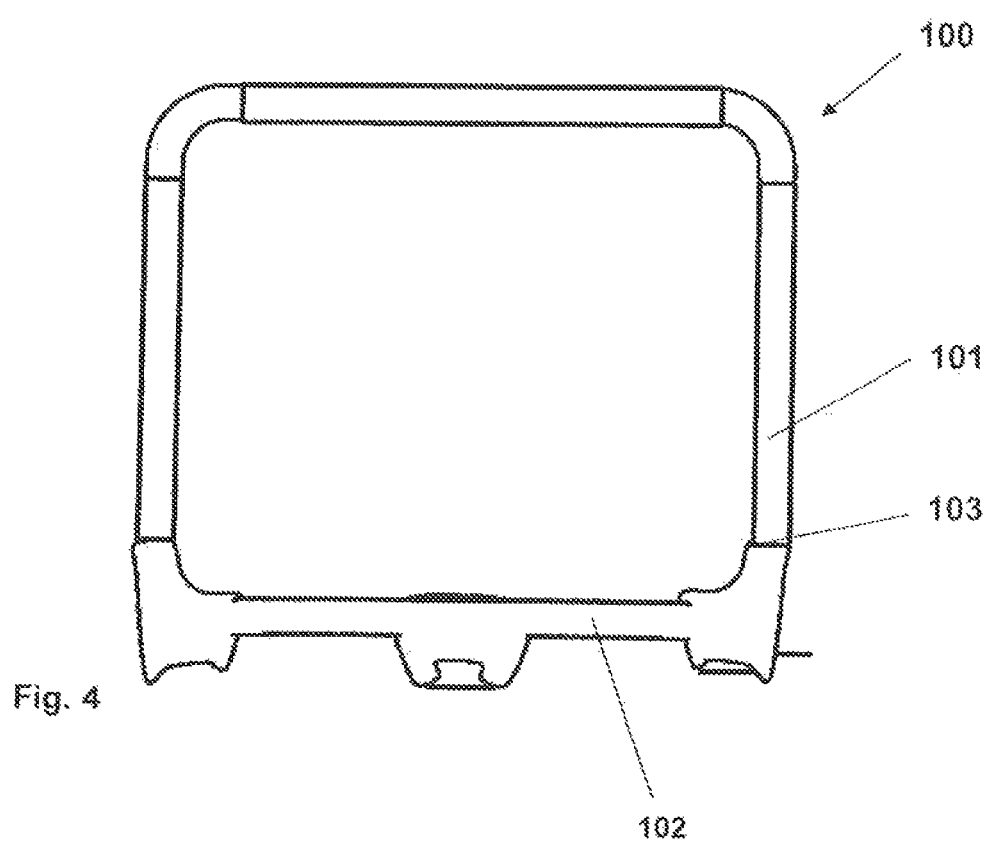

FIG. 4 schematically illustrates a fourth embodiment of the structural element 100 according to the invention. The structural element 100 has a pressed/cast part 102, for example of aluminum, which is molded onto the high-strength first component 101 in the overlapping region 103 by means of the electromagnetic pulse shaping method. Otherwise, reference is made to FIG. 1.

As an alternative, if is also possible for the lower and/or upper crosspiece component to consist of a high-strength material and for the side part, which is manufactured from a light metal, for example aluminum or magnesium, to be molded onto the crosspiece component by means of the electromagnetic pulse shaping method.

Figure 5:
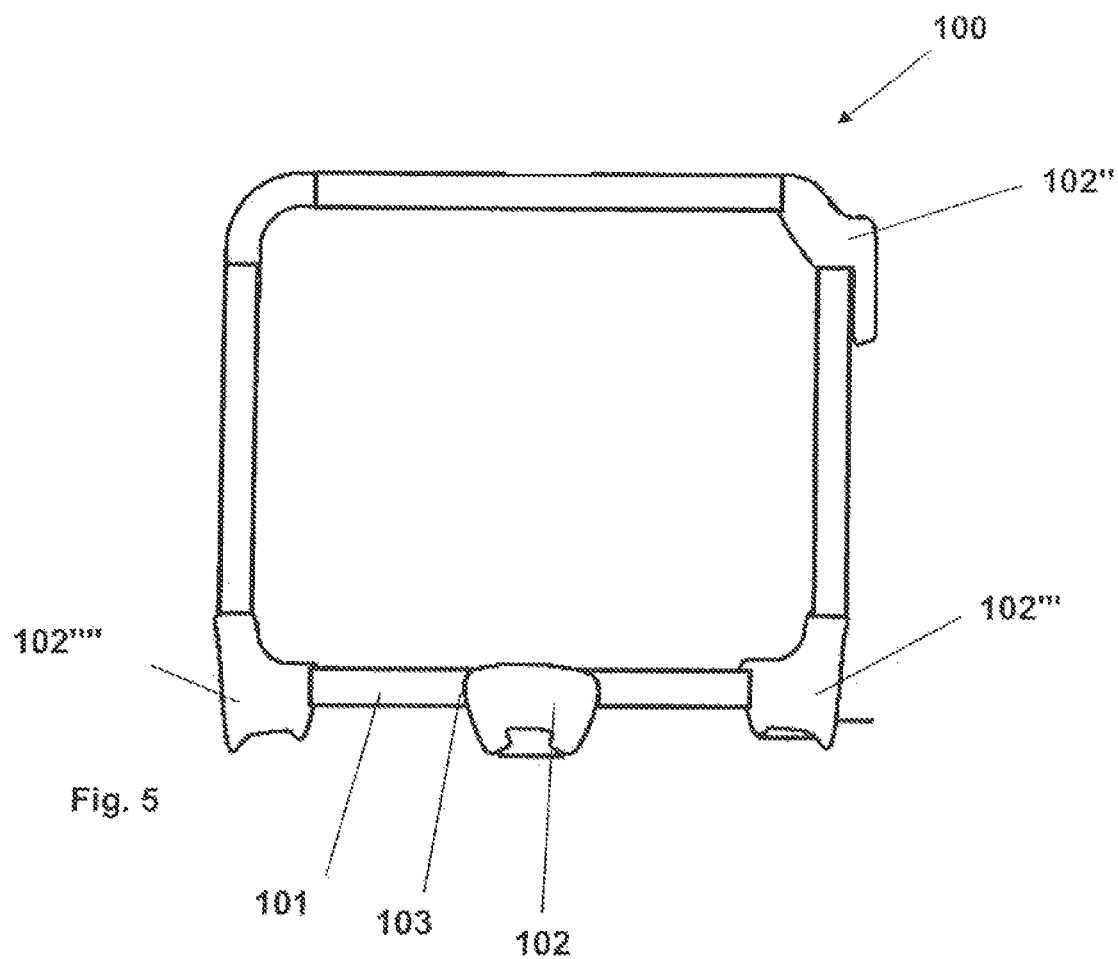

FIG. 5 schematically illustrates a fifth embodiment of the structural element 100 according to the invention. The structural element 100 has shaped parts, such as, for example, corner connectors or brackets 102, 102', 102''', 102'''', which are molded onto the longitudinal tube 101, which, however, may also be designed, for example, as an angled tube, in the overlapping region 103 by means of the electromagnetic pulse shaping method. The shaped parts 102, 102", 102''', 102'''' are manufactured, for example, from steel or aluminum. Otherwise, reference is made to FIG. 1.

As an alternative, it is also possible for the longitudinal tube to be molded onto the corner connector in the overlapping region by means of the electromagnetic pulse shaping method. For this purpose, the corner connector can consist of all electrically conductive and/or non-conductive materials and the longitudinal tube can consist of any conductive material.

Figure 6:
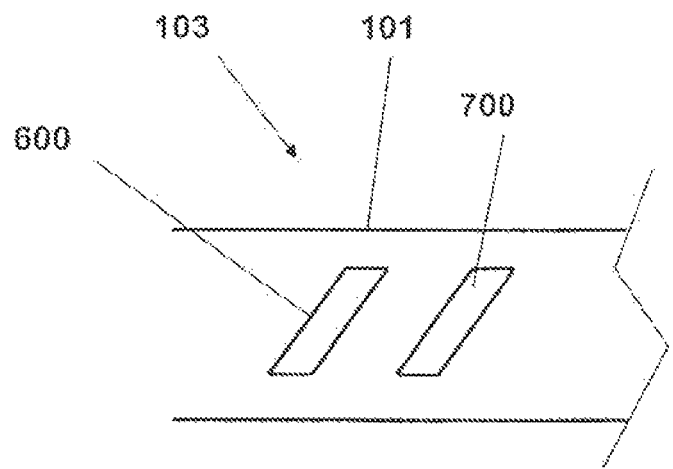
FIG. 6 shows a schematic illustration of a component according to an exemplary embodiment of the present invention.

FIG. 6 schematically illustrates the overlapping region 103 of a component according to the invention as per an exemplary embodiment, which component is used as the first component 101 within the context of this invention. The first component 101 has an interlocking molding 600 and a further interlocking molding 700 in the overlapping region 103. The interlocking moldings 600, 700 are designed as impressions or beads which are of elongated design and extend parallel to one another in the wall of the first component 101. This embodiment is illustrated merely by way of example and other configurations of the interlocking moldings 600, 700 or else a different number of interlocking moldings are also possible, for example transversely or parallel to the main direction of extent of the first component 101.

Figure 7:
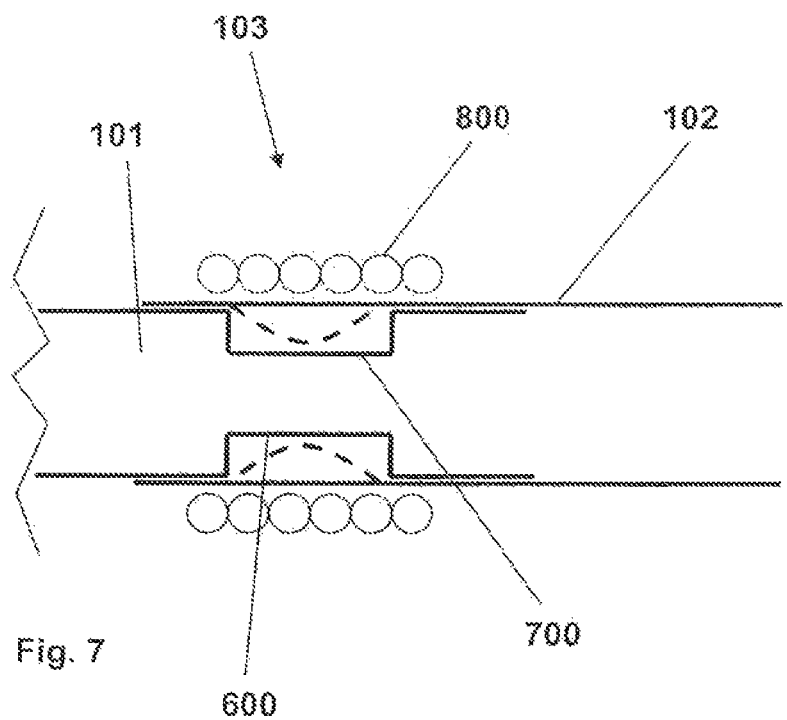
FIGS. 7 and 7A show a schematic illustration of a device according to an exemplary embodiment of the present invention.
Figure 7A:
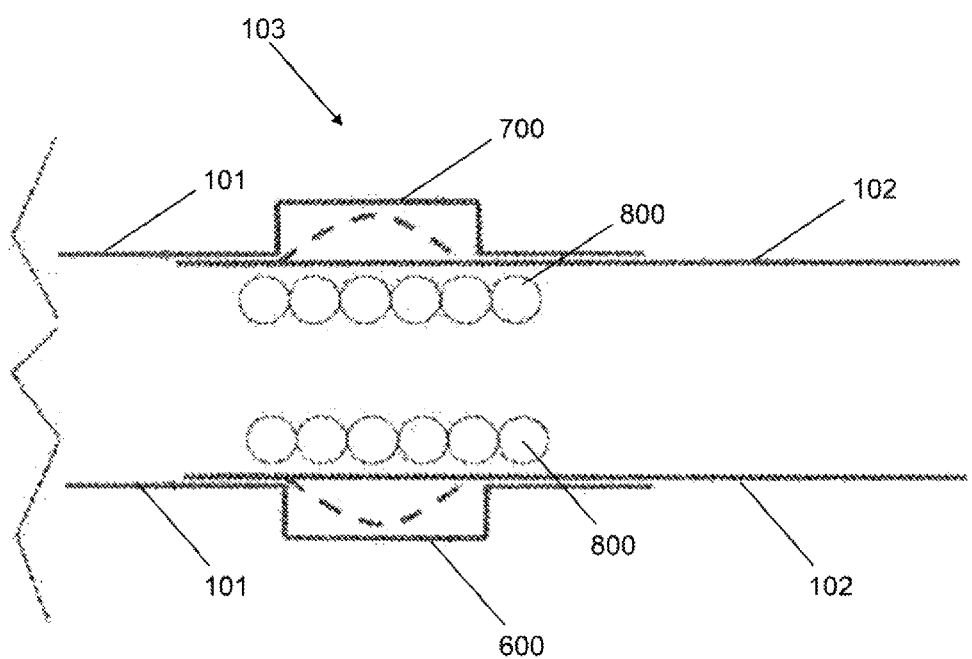

FIG. 7 schematically illustrates an exemplary embodiment of the device according to the invention for producing a structural element 100 according to the invention. In the overlapping region 103, the second component 102 overlaps the first component 101 and in particular the interlocking molding 600 and the further interlocking molding 700 of the first component 101. A coil 800 is arranged in the radial direction outside the first component 101 and second component 102, and therefore the second component 102 is arranged between the first component 101 and the coil 800, wherein a number of windings of the coil 800 are merely schematically illustrated here. During the implementation of the electromagnetic pulse shaping method, the second component 102 is pressed (illustrated by dashed lines) into the interlocking moldings 600, 700 by the radially inwardly acting force generated electromagnetically by means of current flow through the coil 800, thus producing an interlocking or interlocking and frictional connection between the first component 101 and the second component 102. As an alternative, as illustrated in FIG. 7A showing an overlapping region 103, it is also possible for the coil 800 to be arranged in the interior of the second component 102, and therefore the electromagnetic force acts radially outward and the second component 102 is pressed into interlocking moldings 600, 700 of the first component 101, which is arranged radially outside the second component 102.

Figure 8:
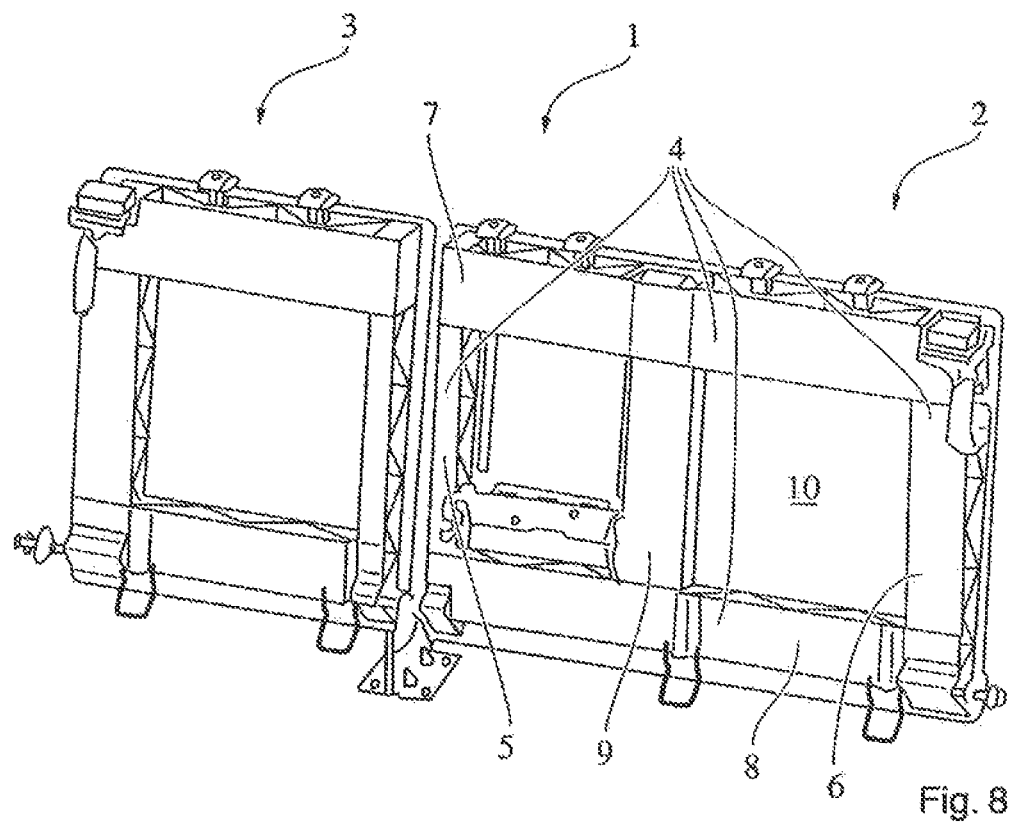
FIGS. 8 to 12 show further embodiments of the present invention.

A further exemplary embodiment (FIG. 8) shows a divided rear seat backrest 1, for example in the division ratio of 60% to 40%. The construction of the frame structure is explained with reference to the larger backrest part 2. The backrest frame 4 consists of two backrest side parts 5 and 6, an upper crosspiece 7 and a lower crosspiece 8. An additional backrest central part 9 may further reinforce the backrest frame 4. As can be seen, this may be omitted from the smaller backrest part 3. All of the outer frame structure parts 5, 6, 7 and 8 are produced from a lightweight construction material (for example aluminum) in the form of extruded profiles, the stiffening ribs of which are oriented transversely with respect to the longitudinal axis of the frame structure parts. In this case, the stiffening ribs can be arranged at any angle with respect to the main plane of extent of the frame structure parts. By contrast, the backrest central part 9 is produced from a lightweight construction material (for example aluminum or magnesium) in the form of an extruded profile, the walls of which are oriented parallel to the longitudinal axis of the frame structure parts. In the exemplary embodiment, the back shell 10 is composed of a high-strength steel. As an alternative, it may also be manufactured from plastic, preferably reinforced with fibers (GFRP or GFRP). The CFRP/GFRP may also be in the form of a sheet-like semi-finished product (plate) based on a thermoplastic matrix. The reinforcement is a woven or laid structure (endless fibers: the fiber length corresponds to the size of the component) made from glass, carbon, aramid or a mixed form. The back shell 10 and the backrest frame 4 and also the frame structure parts 5, 6, 7, 8 and 9 are preferably connected to one another in a cohesively bonded manner, particularly preferably by adhesive bonding by means of one or two components and an adhesive tape.

Figure 9:
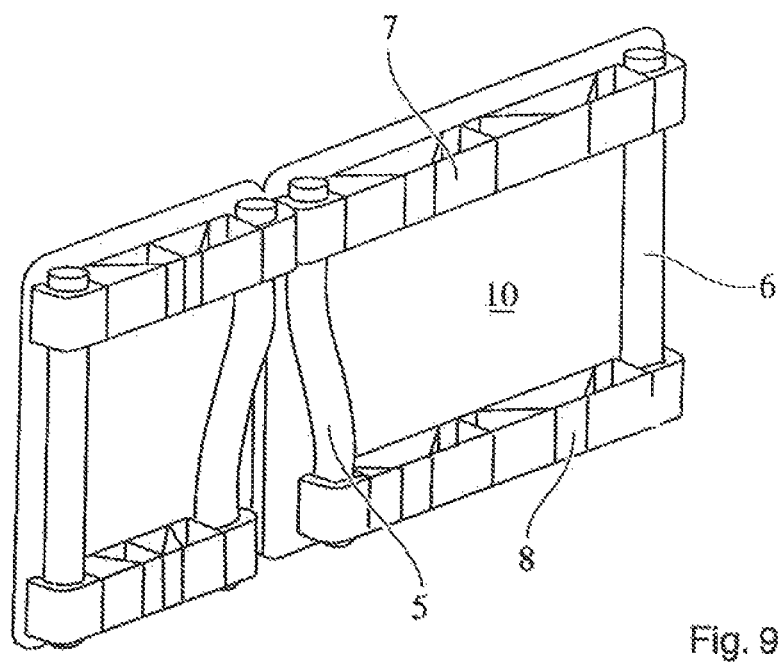

FIG. 9 shows a further exemplary embodiment. The backrest side parts 5 and 6 consist here of steel tube profiles which give rise to the backrest frame 4 in association with the upper crosspiece 7 and the lower crosspiece 8 each in the form of an extruded profile made of lightweight construction material. Said backrest frame could be designed to be reinforced in such a manner that a backrest central part 9 can be omitted here. As before, adhesive bonding is suitable as the cohesive bonding connecting method for this pairing of the material, but so too is, for example, cold metal transfer welding (CMT welding) which makes it possible to connect the aluminum parts to the galvanized steel components.

Figure 10:
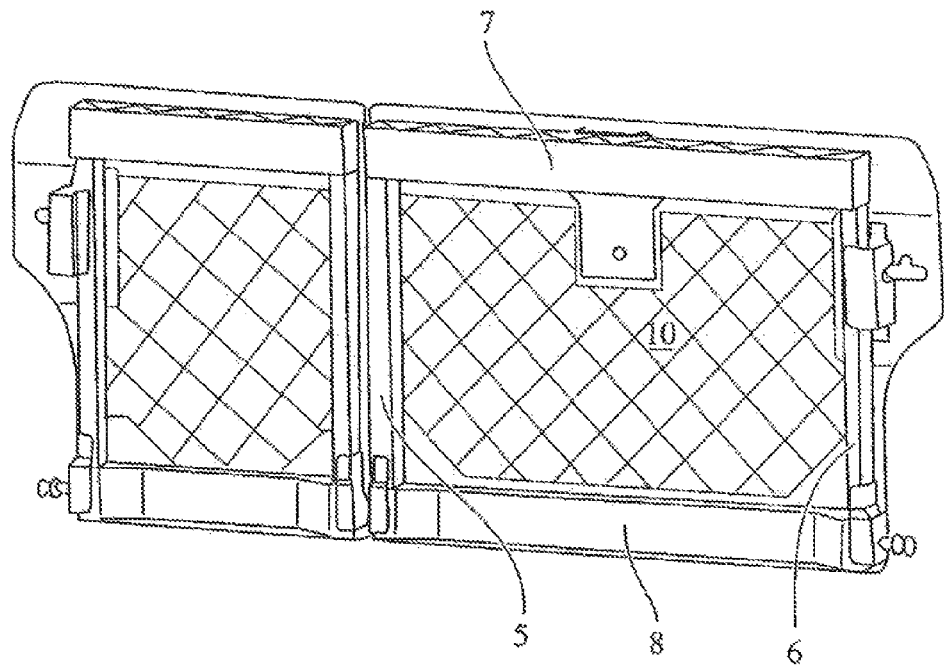

A similar construction is shown in the exemplary embodiment according to FIG. 10. Said construction differs from the previous exemplary embodiment by the use of high-strength rectangular steel tube profiles for the backrest side parts 5 and 6.

Figure 11:
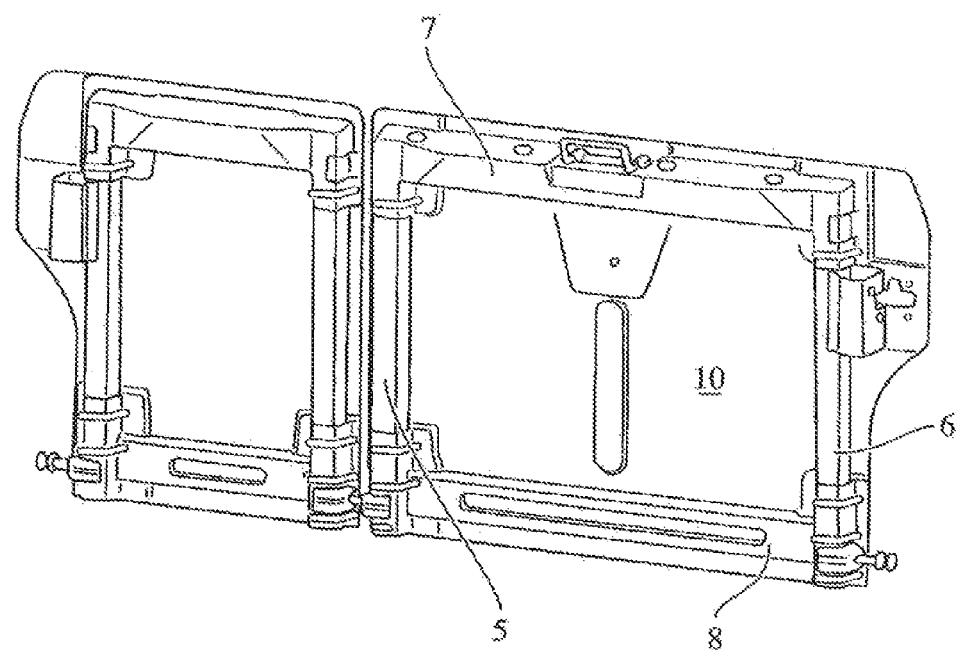

FIG. 11 shows a further, very particularly preferred structural construction of a backrest frame structure. In this case, the backrest frame 4 comprising backrest side parts 5 and 6 is composed of rectangular steel tube profiles together with crosspieces, 7 and 8, for example, of aluminium deep-drawn or pressed profiles. Receptacles for the rectangular steel tube profiles are already integrally formed here in the three-dimensionally shaped aluminum crosspieces.

A common feature of all the exemplary embodiments is that different material combinations from those described are also conceivable. The backrest side parts 5 and 6 may thus be composed of lightweight construction material (for example aluminum or magnesium), steel (for example high-strength) or plastic. The same applies to the crosspieces 7 and 8. These materials may also be provided for the back shell 10. Accordingly, different connecting techniques suitable for the requirements may also be used. In addition to the methods already mentioned, use may be made alternatively or in combination of cohesive bonding, interlocking and/or frictional connecting techniques, for example welding (for example MIG), CMT welding (cold metal transfer—in the case of aluminum-steel combinations), plug-in/screw connections, junction element connections (for example diecast aluminum junctions), rivet connections, press-joining (Tox clinching), cold roll-forming or press connections.

According to a further embodiment, it is optionally possible for the components to be connected to one another after an adhesive bonding process by means of special high-strength tacker clips which are preferably manufactured from stainless steel. A further preference is for the components to be connected exclusively by the use of clips. As an alternative or optionally, it is furthermore preferably possible, after the application of glue, for the components to be coupled to one another by a strap-type connection, at least for the further transport. These connections advantageously permit an additional securing of the components to one another. The securing means used can preferably be cohesive bonding, interlocking and/or frictional connecting techniques, for example welding (for example MIG), CMT welding (cold metal transfer—in the case of aluminium-steel combinations), plug-in/screw connections, junction element connections (for example diecast aluminum junctions), rivet connections, press-joining (Tox clinching), cold roll-forming or press connections.

Figure 12:
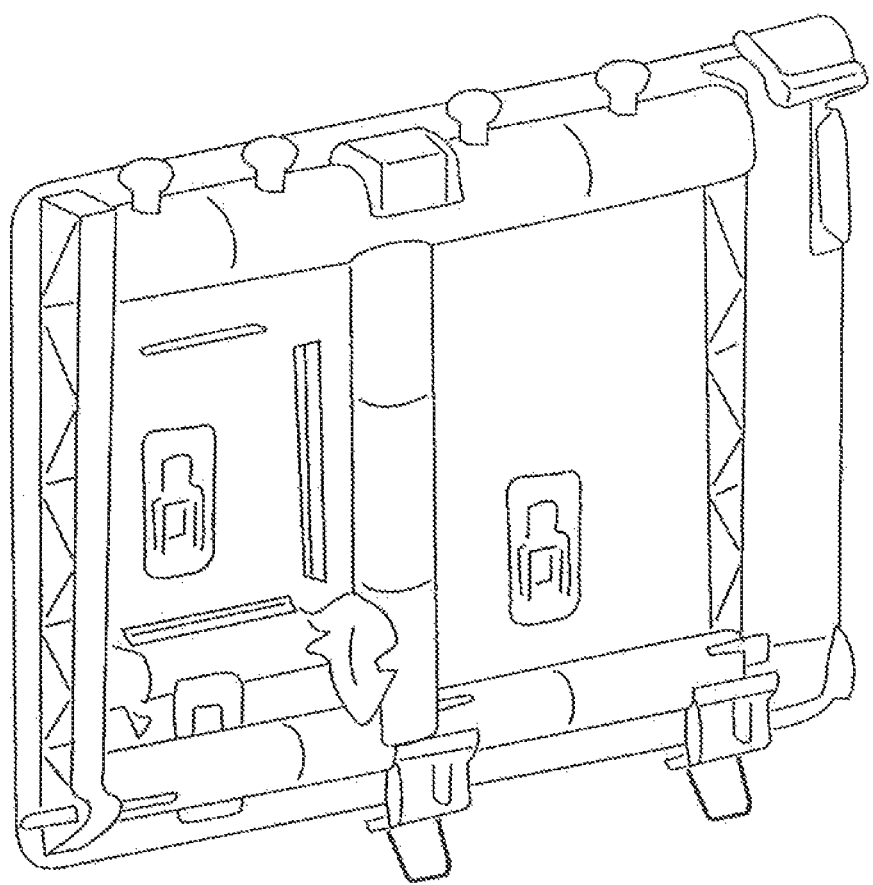

All of the conceivable and/or necessary components can be integrated into the backrest frame structure in a simple manner, as FIG. 12 shows. For example, components for the backrest inclination function, through-loading option and child seat securing (Isofix, Top Tether) or receptacles for seatbelt rollers, head restraints and arm rests are shown here.

LIST OF REFERENCE NUMBERS

1 Divided rear seat backrest
2 Larger backrest part
3 Smaller backrest part
4 Backrest frame
5, 6 Backrest side parts
7 Upper crosspiece
8 Lower crosspiece
9 Backrest central part
10 Back, shell
100 Structural element
101, 101' First component
102, 102', 102", 102''', 102'''' Second component
103, 103', 103", 103''' Overlapping region
600 Interlocking molding
700 Further interlocking molding
800 Coil

The invention claimed is:

1. A structural element for a motor vehicle seat, wherein the structural element has a first component and a second component, wherein the first component and the second component have an interlocking or an interlocking and frictional connection in an overlapping region,
   wherein the first component has a polygonal cross section, at least in the overlapping region;
      wherein the connection in the overlapping region is produced by an electrically conductive driving method element arranged in a direction outside the first component and the second component;
      wherein the first component has at least one interlocking molding on at least one wall of the polygonal cross section in the overlapping region,
      wherein the second component is molded into said at least one interlocking molding by a radially inwardly acting force by the electrically conductive driving element,
      wherein the at least one interlocking molding of the first component is designed in the overlapping region as an impression, wherein the impression is arranged at an angle of between 44° and 46° with respect to a main direction of extent of the first component.

2. The structural element as claimed in claim 1, wherein the second component comprises an electrically conductive material, a steel material, an aluminum material or a magnesium material or a material consisting of material-to-material bonding connections of different materials.

3. The structural element as claimed in claim 1, wherein the impression has an impression depth which varies in the longitudinal direction of the impression.

4. The structural element as claimed in claim 1, wherein the first component has at least two interlocking moldings in the overlapping region, wherein the interlocking moldings are arranged at a uniform spacing of an angle at a circumference from one another.

5. The structural element as claimed in claim 1, wherein the first component has the interlocking molding and at least one further interlocking molding in the overlapping region, wherein the interlocking molding and the further interlocking molding are designed as impressions having in each case a longitudinal direction, wherein the longitudinal directions of the impressions are arranged parallel to one another.

6. The structural element as claimed in claim 1, wherein the first component has a hexagonal or octagonal cross section at least in the overlapping region.

7. A hybrid structural component of a motor vehicle seat comprising the structural element of claim 1, wherein the structural element has a first structural part and a second structural part, wherein the first structural part is connected to the second structural part by an electromagnetic pulse shaping method, wherein the first structural part comprises a lightweight construction material and the second structural part comprises a steel material.

8. The hybrid structural component as claimed in claim 7, wherein the first structural part is further connected to the second structural part in a cohesively bonded manner or the structural parts are coupled to each other by a clip and/or a strap.

9. The hybrid structural component as claimed in claim 7, wherein the second structural part comprises a lightweight metal or a fiber-reinforced material reinforced with carbon fibers and/or glass fibers.

10. A structural element for a motor vehicle seat, wherein the structural element has a first component and a second component, wherein the first component and the second component have an interlocking or an interlocking and frictional connection in an overlapping region,
- wherein the first component has a polygonal cross section, at least in the overlapping region,
- wherein the connection in the overlapping region is produced by an electrically conductive driving element arranged in a direction outside the first component and the second component,
- wherein the first component has a plurality of interlocking moldings on at least one wall of the polygonal cross section in the overlapping region,
- wherein the second component is molded into the interlocking moldings by a radially inwardly acting force by the electrically conductive driving element, and
- wherein the interlocking moldings of the first component are designed in the overlapping region as an impression, wherein the impression is arranged parallel or perpendicularly to a main direction of extent of the first component.

* * * * *